US008161002B2

(12) United States Patent
Castelli et al.

(10) Patent No.: US 8,161,002 B2
(45) Date of Patent: Apr. 17, 2012

(54) SYSTEM, METHOD, AND COMPUTER READABLE MEDIA FOR REPLICATING VIRTUAL UNIVERSE OBJECTS

(75) Inventors: Vittorio Castelli, Croton on Hudson, NY (US); Rick A. Hamilton, II, Charlottesville, VA (US); Steven M. Harrison, Bremerton, WA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 12/128,056

(22) Filed: May 28, 2008

(65) Prior Publication Data

US 2009/0300059 A1    Dec. 3, 2009

(51) Int. Cl.
*G06F 17/00* (2006.01)
(52) U.S. Cl. ........ 707/626; 707/613; 707/619; 707/638; 707/639
(58) Field of Classification Search ........... 707/999.101, 707/999.102, 999.104, 999.105, 999.106
See application file for complete search history.

(56) References Cited

U.S. PATENT DOCUMENTS

| 7,065,553 | B1* | 6/2006 | Chesley et al. | 709/205 |
|---|---|---|---|---|
| 7,209,139 | B1* | 4/2007 | Keet et al. | 345/427 |
| 2003/0065668 | A1 | 4/2003 | Sowizral et al. | |
| 2005/0125609 | A1* | 6/2005 | Satoyama et al. | 711/114 |
| 2005/0160315 | A1* | 7/2005 | Chandrasekaran et al. | 714/15 |
| 2006/0178972 | A1* | 8/2006 | Jung et al. | 705/35 |
| 2007/0271301 | A1* | 11/2007 | Klive | 707/104.1 |

* cited by examiner

*Primary Examiner* — Pierre Vital
*Assistant Examiner* — Mohammad S Rostami
(74) *Attorney, Agent, or Firm* — Cantor Colburn LLP; Mark Vallone

(57) ABSTRACT

A system, a method and a computer readable media for replicating virtual universe objects are provided. In one exemplary embodiment, the method includes determining a first set of VU objects associated with a first user. The method further includes determining replication priority values for the first set of VU objects utilizing predetermined priority value rules. Each VU object of the first set of VU objects has a replication priority value. The method further includes determining a second set of VU objects from the first set of VU objects based on the replication priority values associated with the first set of VU objects. The method further includes replicating the second set of VU objects from a primary VU computer server to a first device.

17 Claims, 12 Drawing Sheets

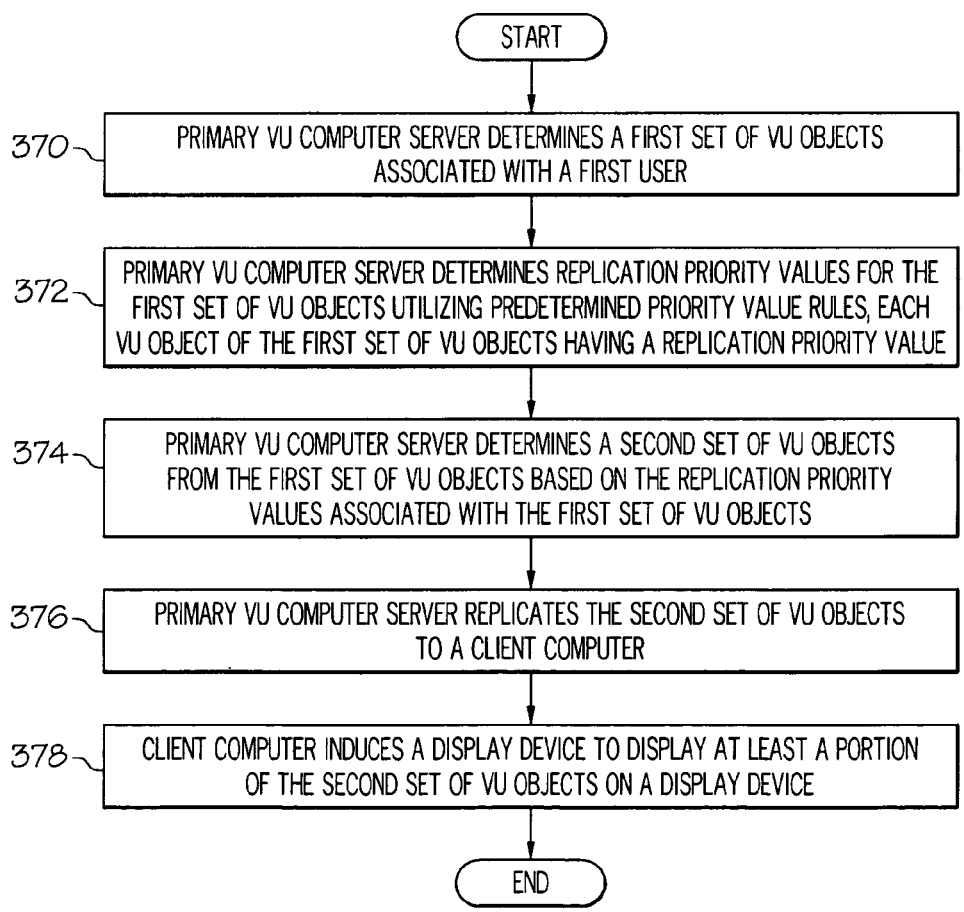

SYSTEM, METHOD, AND COMPUTER READABLE MEDIA FOR REPLICATING VIRTUAL UNIVERSE OBJECTS

FIELD OF INVENTION

This application relates to a system, a method, and a computer readable media for replicating virtual universe objects.

BACKGROUND OF INVENTION

A virtual universe is an interactive simulated environment accessed by multiple users through an on-line interface. Users inhabit and interact in the virtual universe via avatars, which are two or three-dimensional graphical representations of humanoids. There are many different types of virtual universe. However, there are several features many virtual universes generally have in common: (i) Shared Space: the world allows many users to participate at once; (ii) Graphical User Interface: the environment depicts space visually, ranging in style from 2-D "cartoon" imagery to more immersive 3-D environments; (iii) Immediacy: interaction takes place in real time, (iv) Interactivity: the environment allows users to alter, develop, build, or submit customized content: (v) Persistence: the environment's existence continues regardless of whether individual users are logged in; (vi) Socialization/Community: the environment allows and encourages the formation of social groups such as teams, guilds, clubs, housemates, and neighborhoods, for example.

An avatar can have a wide range of business and social experiences. Such business and social experiences are becoming more common in increasingly important in on-line virtual universes, such as that provided in the on-line world Second Life (Second life is a trademark of Linden Research in the United States, other countries, or both).

A viewable field is a field of view for a particular user. The viewable field for a particular user includes virtual universe objects ("VU objects") as well as avatars belonging to other users. The VU objects are elements in a virtual universe that do not represent a user. A VU object may be for example, buildings, statues, billboards, signs, and advertisements in the virtual universe. The viewable field of a particular user is determined by the virtual universe grid software according to geometries and textures that are currently loaded in the user's virtual universe client. The virtual universe grid determines a length of time that a user views an object based on processing data sent to each virtual universe client. VU objects are identified by UUIDs which are unique identifiers associated with the VU objects. Each VU object has a unique UUID.

The avatar and other VU objects are typically stored on a central computer server. When a user at a client computer accesses or enters a virtual universe utilizing the client computer, the information associated with their avatar and the other VU objects at the virtual location in the virtual universe may be replicated to the client computer for the purpose of providing a speedier VU experience. However the replication process may consume relatively large amounts of bandwidth and therefore reduce the benefits of replication.

Accordingly, the inventors herein have recognized a need for an improved system, method, and computer readable media for replicating VU objects from a central computer server that minimizes and/or eliminates the above-mentioned deficiency.

SUMMARY OF INVENTION

A method for replicating VU objects of a virtual universe in accordance with an exemplary embodiment is provided. The method includes determining a first set of VU objects associated with a first user. The method further includes determining replication priority values for the first set of VU objects utilizing predetermined priority value rules. Each VU object of the first set of VU objects has a replication priority value. The method further includes determining a second set of VU objects from the first set of VU objects based on the replication priority values associated with the first set of VU objects. The method further includes replicating the second set of VU objects from a primary VU computer server to a first device.

A system for replicating VU objects of a virtual universe in accordance with another exemplary embodiment is provided. The system includes a primary VU computer server. The system further includes a first device operably communicating with the primary VU computer server. The primary VU computer server is configured to determine a first set of VU objects associated with a first user. The primary VU computer server is further configured to determine replication priority values for the first set of VU objects utilizing predetermined priority value rules. Each VU object of the first set of VU objects has a replication priority value. The primary VU computer server is further configured to determine a second set of VU objects from the first set of VU objects based on the replication priority values associated with the first set of VU objects. The primary VU computer server is further configured to replicate the second set of VU objects to the first device.

A computer readable media having computer executable instructions for replicating VU objects of a virtual universe in accordance with another exemplary embodiment is provided. The computer readable media includes code for determining a first set of VU objects associated with a first user. The computer readable media further includes code for determining replication priority values for the first set of VU objects utilizing predetermined priority value rules. Each VU object of the first set of VU objects has a replication priority value. The computer readable media further includes code for determining a second set of VU objects from the first set of VU objects based on the replication priority values associated with the first set of VU objects. The computer readable media further includes code for replicating the second set of VU objects from a primary VU computer server to a first device.

BRIEF DESCRIPTION OF DRAWINGS

FIG. 13 is a schematic of a hard-drive utilized in the system of FIG. 12; and

FIG. 14 is a flowchart of another method for replicating VU objects in a virtual universe in accordance with another exemplary embodiment.

DESCRIPTION OF EXEMPLARY EMBODIMENTS

Figure 1:
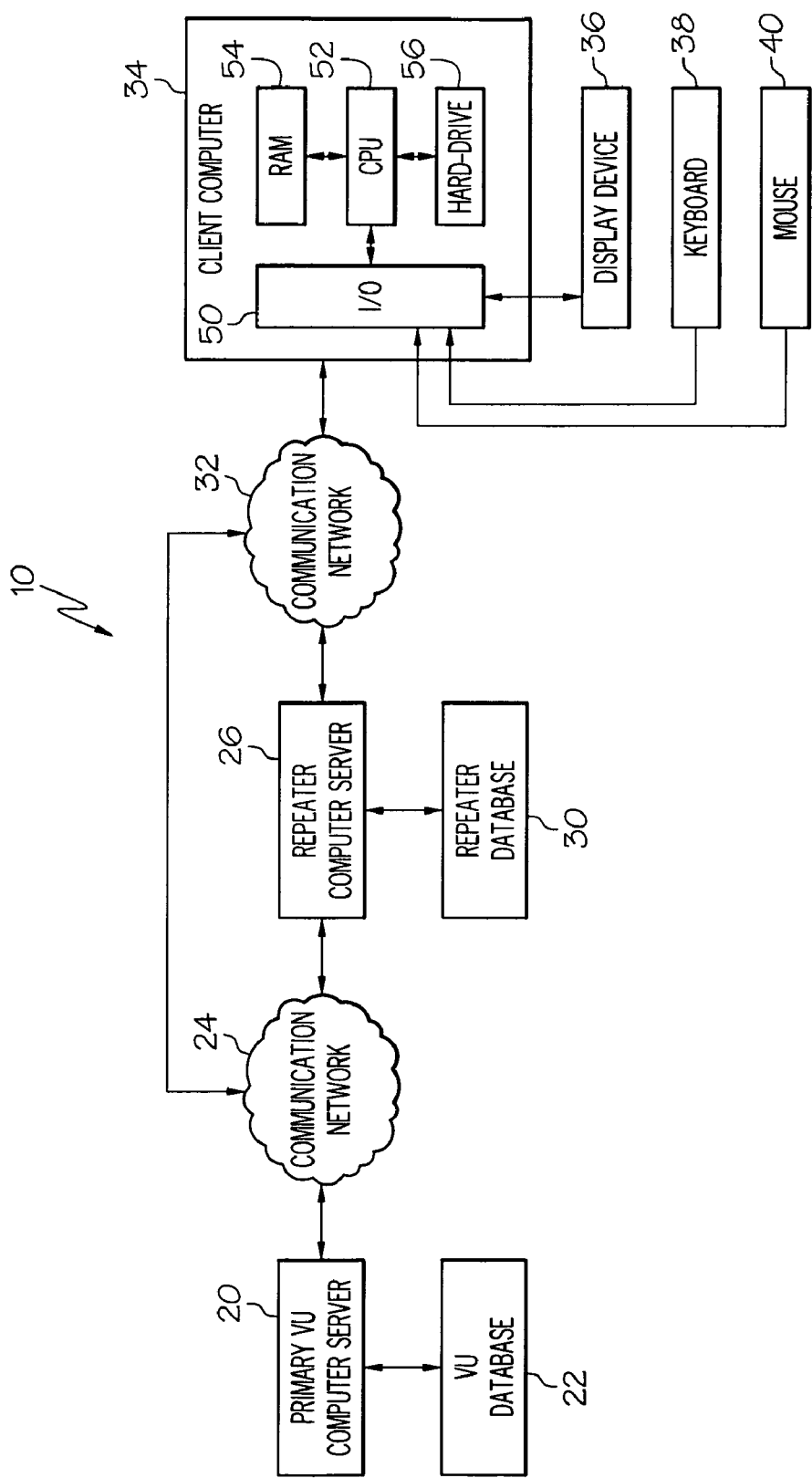
FIG. 1 is a schematic of a system for the replicating VU objects in a virtual universe in accordance with an exemplary embodiment.

Referring to FIG. 1, a system 10 for replicating VU objects of the virtual universe in accordance with an exemplary embodiment are provided. The system 10 includes a primary VU computer server 20, a VU database 22, a communication network 24, a repeater computer server 26, a repeater database 30, a communication network 32, a client computer 34, a display device 36, a keyboard 38, and a mouse 40. An advantage of the system 10 is that the system 10 determines replication priority values for VU objects associated with the user utilizing predetermined priority value rules and replicates a portion of the VU objects from the primary VU computer server 20 based on replication priority values. Accordingly, the client computer 34 does not have to subsequently query the primary VU computer server 20 for these VU objects.

The primary VU computer server 20 is configured to execute software routines for providing data corresponding to an avatar and other VU objects associated with a user in response to requests received from the client computer 34. Further, the primary VU computer server 20 is configured to replicate a subset of the VU objects associated with the user to the repeater computer server 26 as will be described in further detail below.

The communication network 24 is configured to route data between the primary VU computer server 20 and the repeater computer server 26. Further, the communication network 24 communicates with the communication network 32.

The repeater computer server 26 is configured to receive data corresponding to VU Object UUIDs and associated VU objects from the primary VU computer server 20 via the communication network 24 and to store the VU Object UUIDs and the VU objects in the repeater database 30. Further, the repeater computer server 26 is configured to send VU Object UUIDs and the associated VU objects stored in the repeater database 32 to the client computer 34 via the communication network 32.

The communication network 32 is configured to route data between the repeater computer server 26 and the client computer 34. Further, the communication network 32 communicates with the communication network 24.

The client computer 34 is configured to receive data corresponding to VU Object UUIDs and associated VU objects from both the repeater computer server 26 and the primary VU computer server 20. Further, the client computer 34 is configured to display VU objects in the virtual universe on the display device 36. The client computer 34 includes an input/output ("I/O") interface 50, a central processing unit ("CPU") 52, a random access memory ("RAM") 54, and a hard-drive 56. The CPU 52 operably communicates with the I/O interface 50, the RAM 54, and the hard-drive 56. The CPU 52 executes algorithms stored in the hard-drive 56 and the RAM 54 for displaying the virtual universe and associated VU objects and avatars on the display device 36. The CPU 52 also receives commands from the keyboard 38 and the mouse 40, via the I/O interface 50, for moving an avatar to desired locations within the virtual universe and for allowing the avatar to complete desired tasks at desired locations within the virtual universe.

Figure 2:
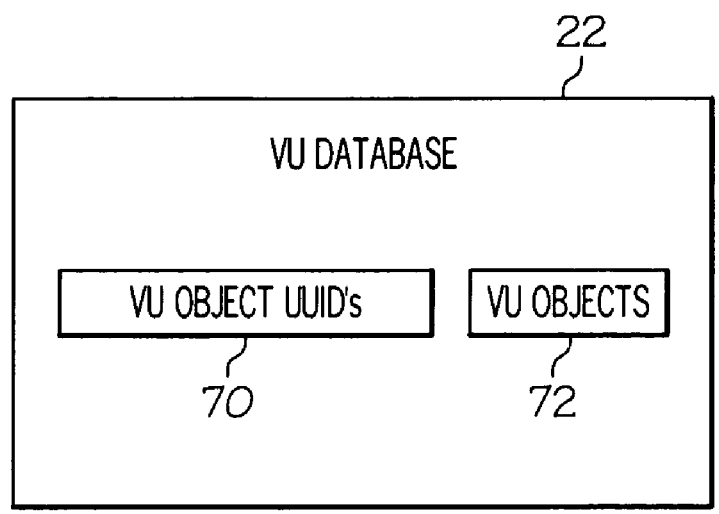
FIG. 2 is a schematic of a VU database utilized in the system of FIG. 1.
Figure 3:
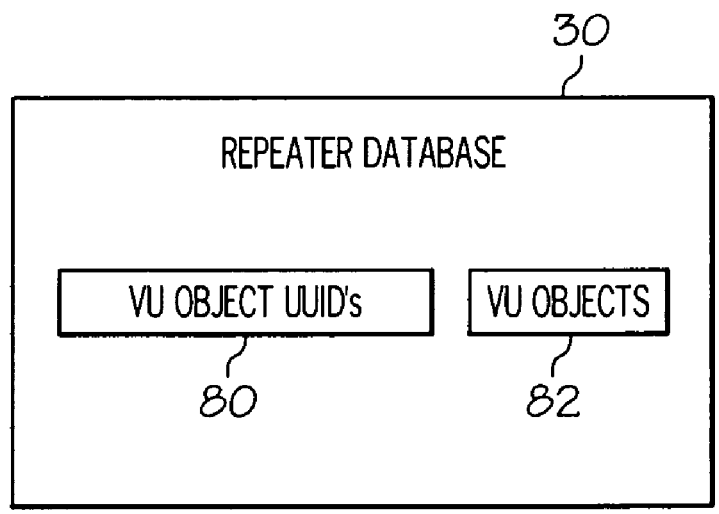
FIG. 3 is a schematic of a repeater database utilized in the system of FIG. 1.

Referring to FIGS. 2 and 3, in one exemplary embodiment, the primary VU computer server 20 can retrieve VU Object UUIDs 70 and associated VU objects 72 from the VU database 22. Further, the primary VU computer server 20 can replicate a subset of the VU Objects UUIDs 70 and the associated VU objects 72 to the repeater computer server 26 as described in further detail below. In one exemplary embodiment, the subset of the VU Objects UUIDs 70 and the VU objects 72 are VU Object UUIDs 80 and VU objects 82, respectively. Upon receipt of the VU Object UUIDs 80 and the VU objects 82, the repeater computer server 26 stores the VU Object UUIDs 80 and the VU objects 82 in the repeater database 30. In an alternative embodiment, other data may be stored such as a timestamp of the VU object's time of last modification for example. Data relating to a VU object can be retrieved by querying the VU object's file or metadata properties. Further, an additional table comprising VU object UUIDs, user IDs, and last replication timestamps can be stored in the repeater database 20. However, this additional table may be alternately stored in the VU database 22 or in the hard-drive 56 of the client computer 34.

Figure 4:
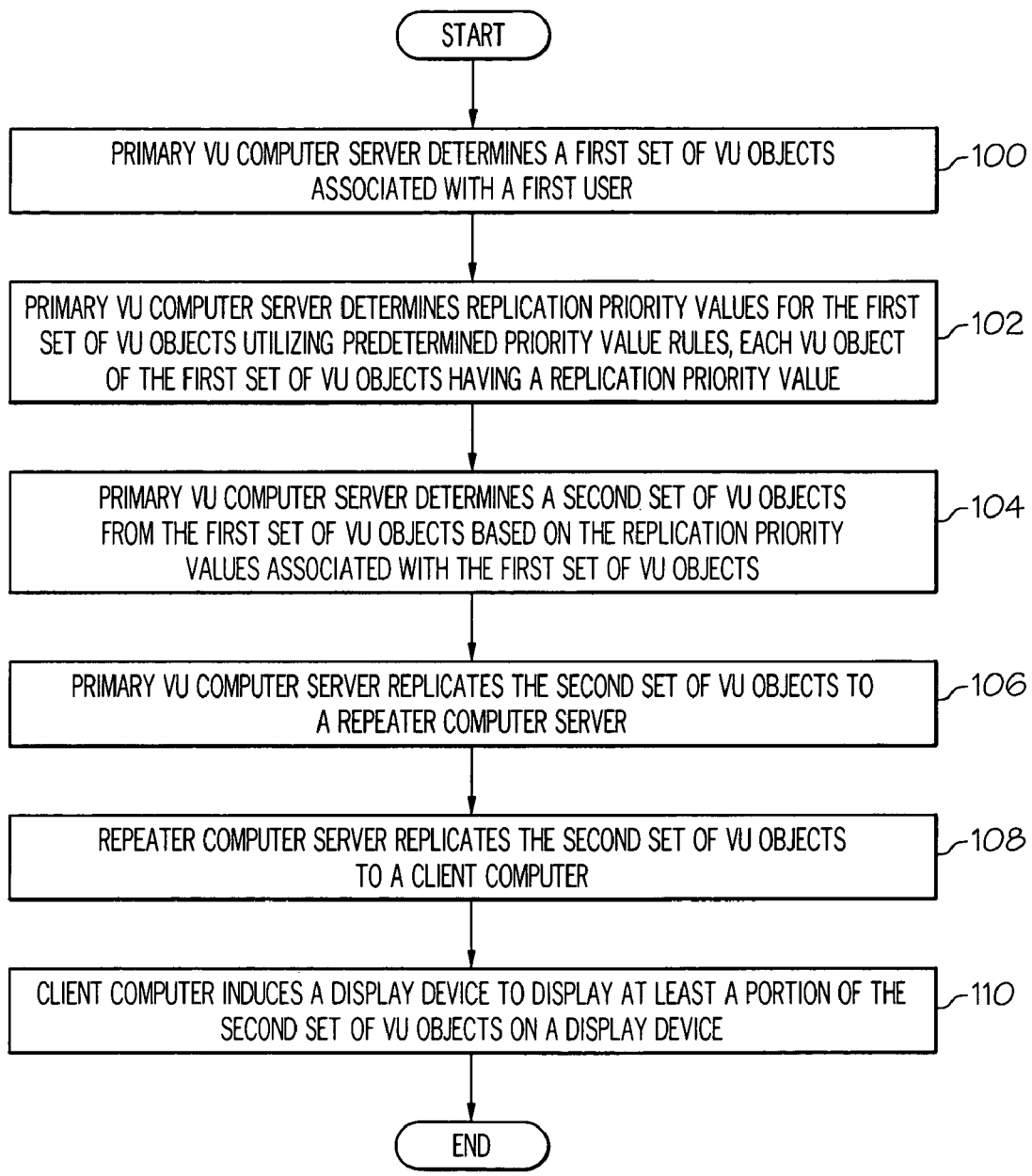
FIGS. 4-11 are flowcharts of a method for replicating VU objects in a virtual universe in accordance with another exemplary embodiment.

Referring to FIG. 4, a flowchart of a method for replicating VU objects in a virtual universe in accordance with another exemplary embodiment will be explained.

At step 100, the primary VU computer server 20 determines a first set of VU objects associated with a first user.

Next at step 102, the primary VU computer server 20 determines replication priority values for the first set of VU objects utilizing predetermined priority value rules. Each VU object of the first set of VU objects has a replication priority value.

Next at step 104, the primary VU computer server 20 determines a second set of VU objects from the first set of VU objects based on the replication priority values associated with the first set of VU objects.

Next at step 106, the primary VU computer server 20 replicates the second set of VU objects to the repeater computer server 26.

Next at step 108, the repeater computer server 26 replicates the second set of VU objects to the client computer 34.

Next at step 110, the client computer 34 induces the display device 36 to display at least a portion of the second set of VU objects on the display device 36.

Figure 5:
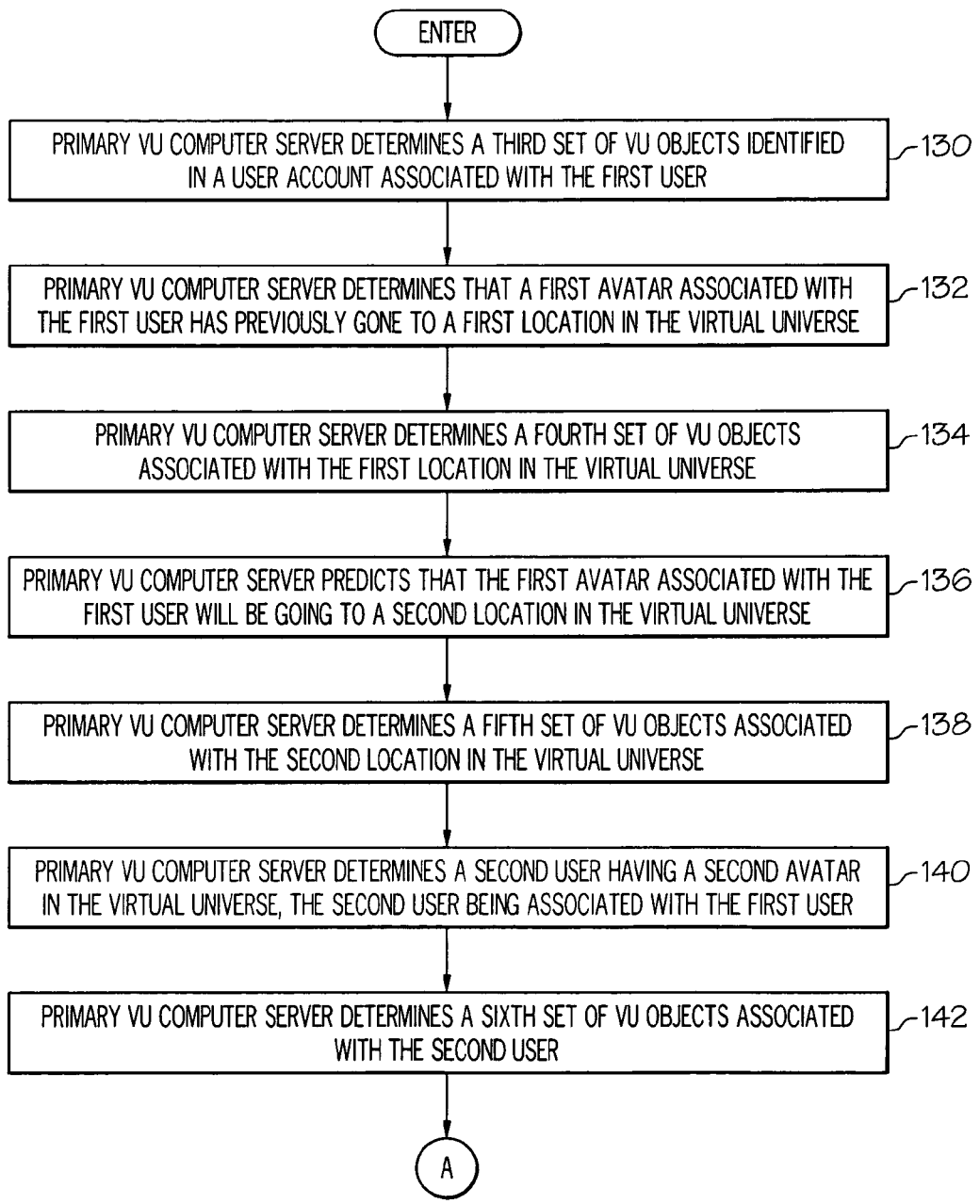
Figure 6:
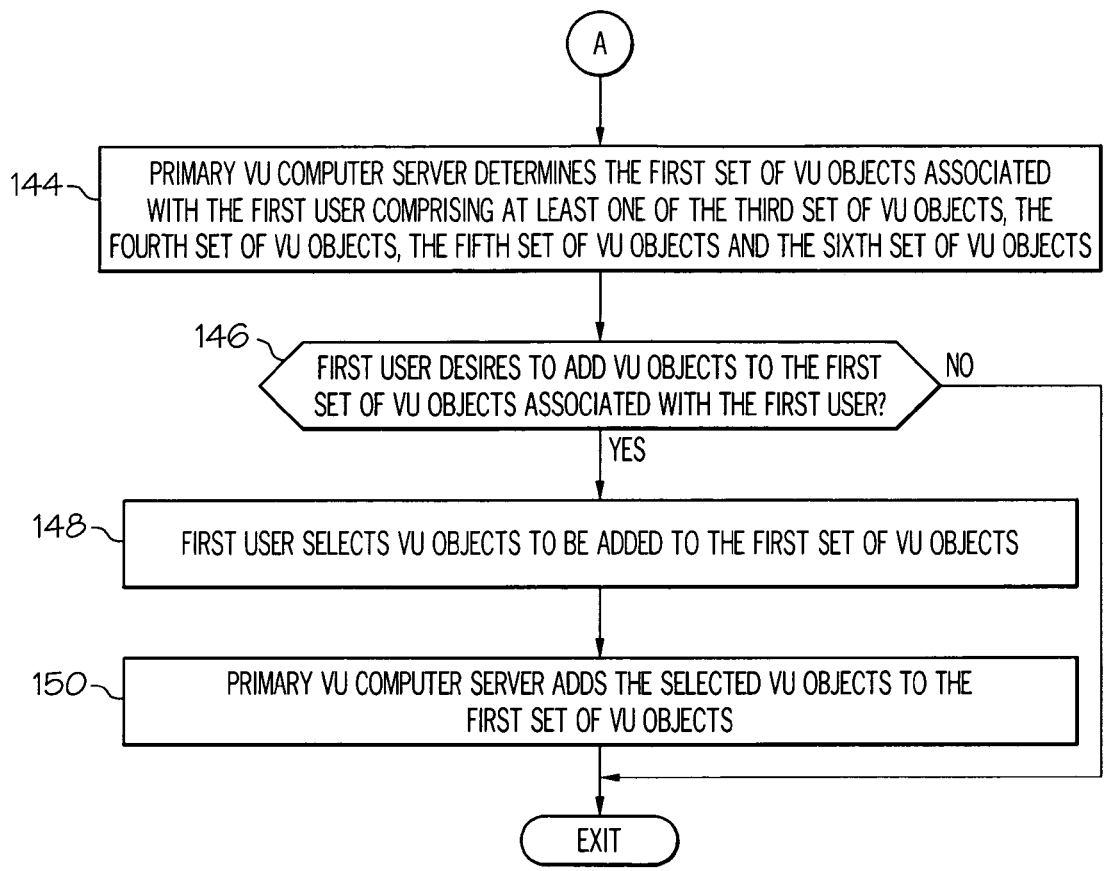
Figure 7:
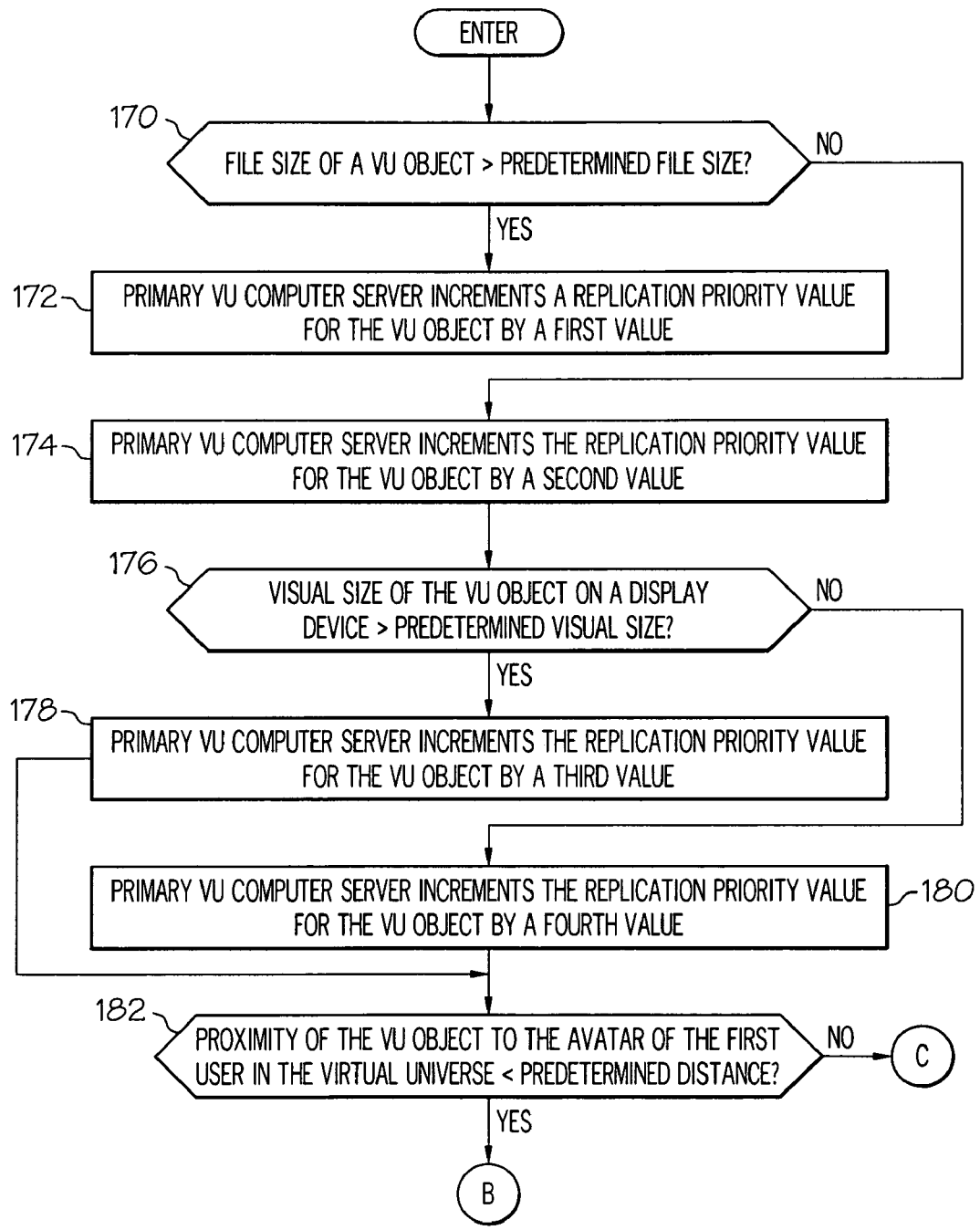
Figure 8:
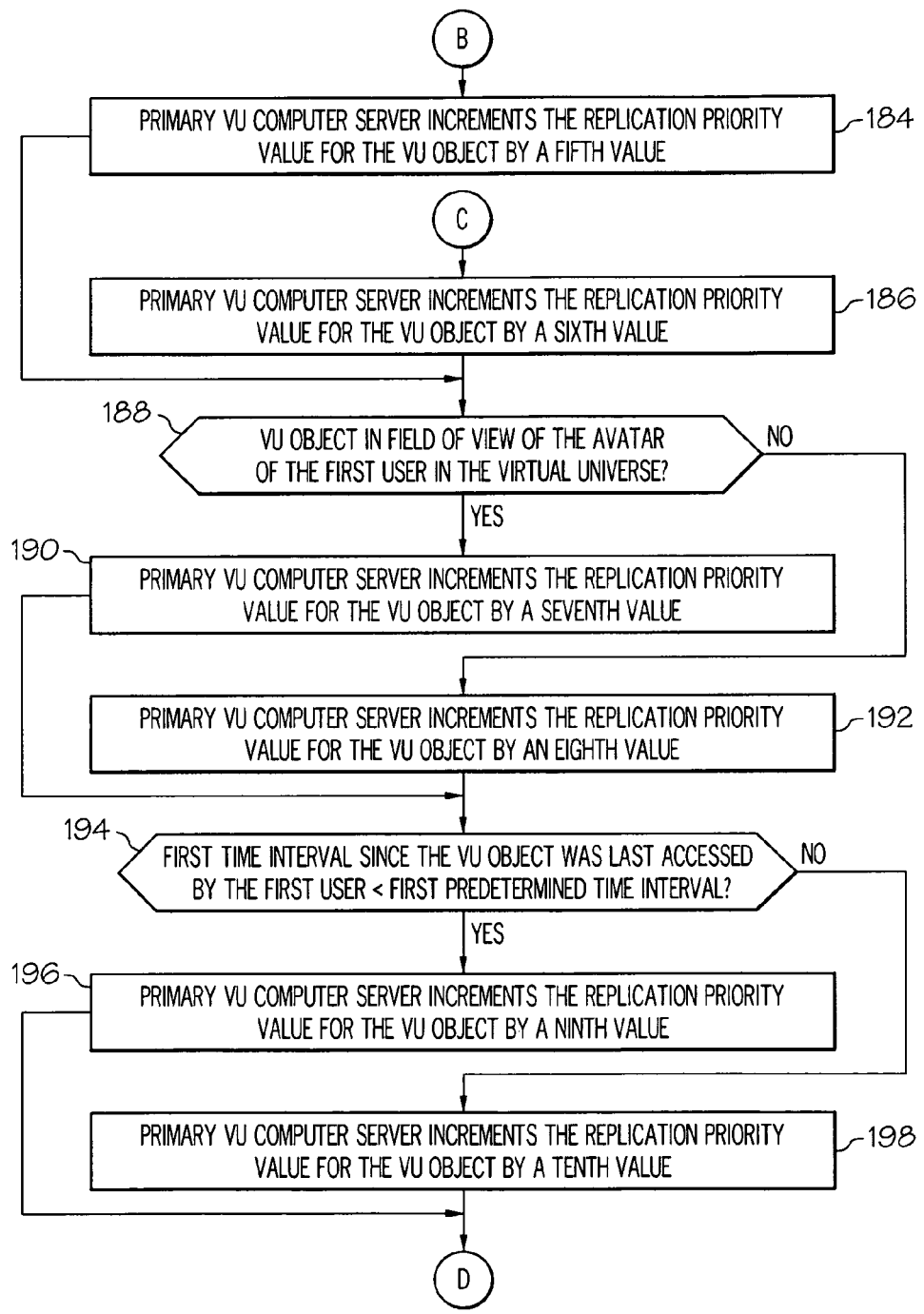
Figure 9:
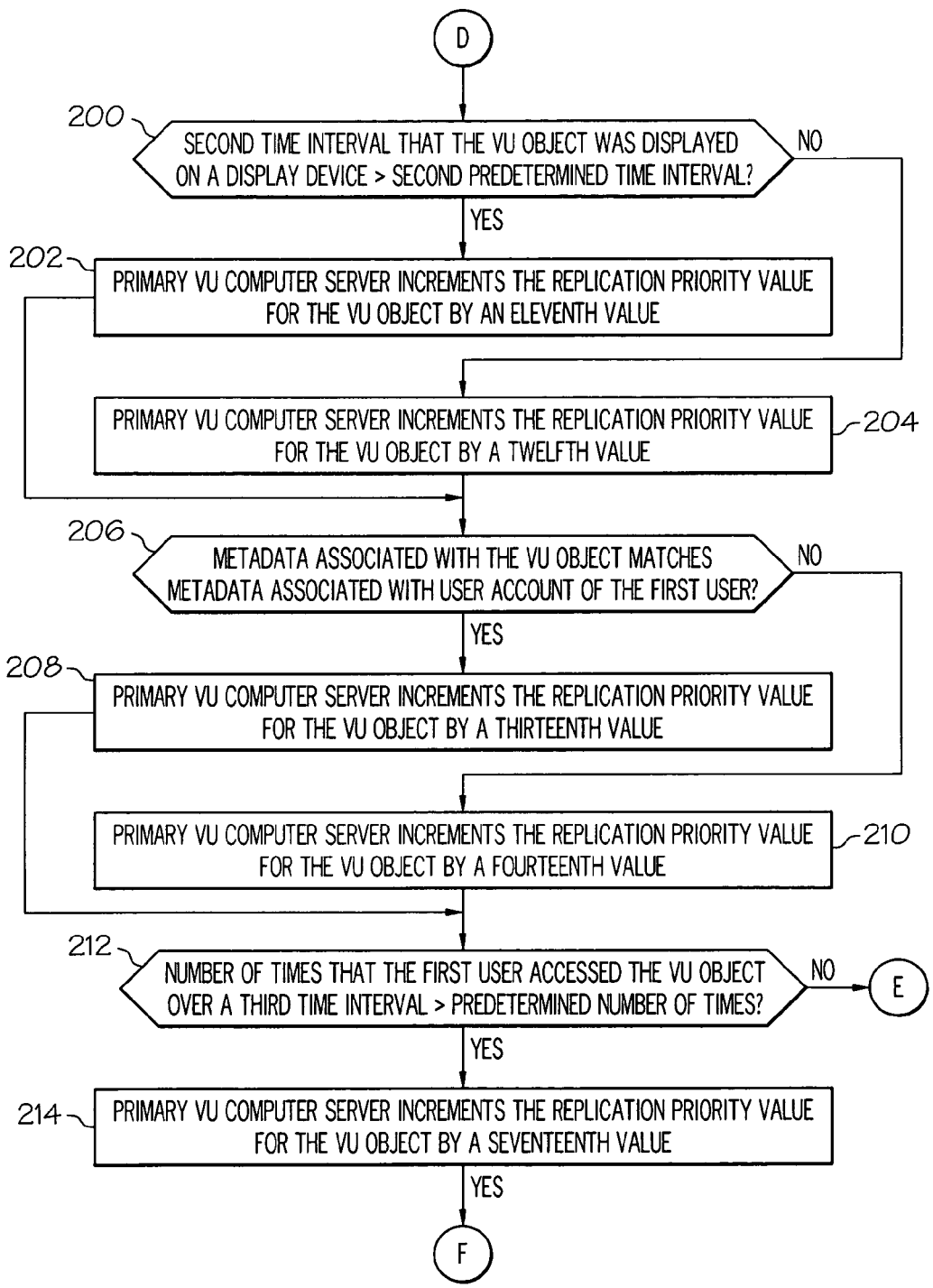
Figure 10:
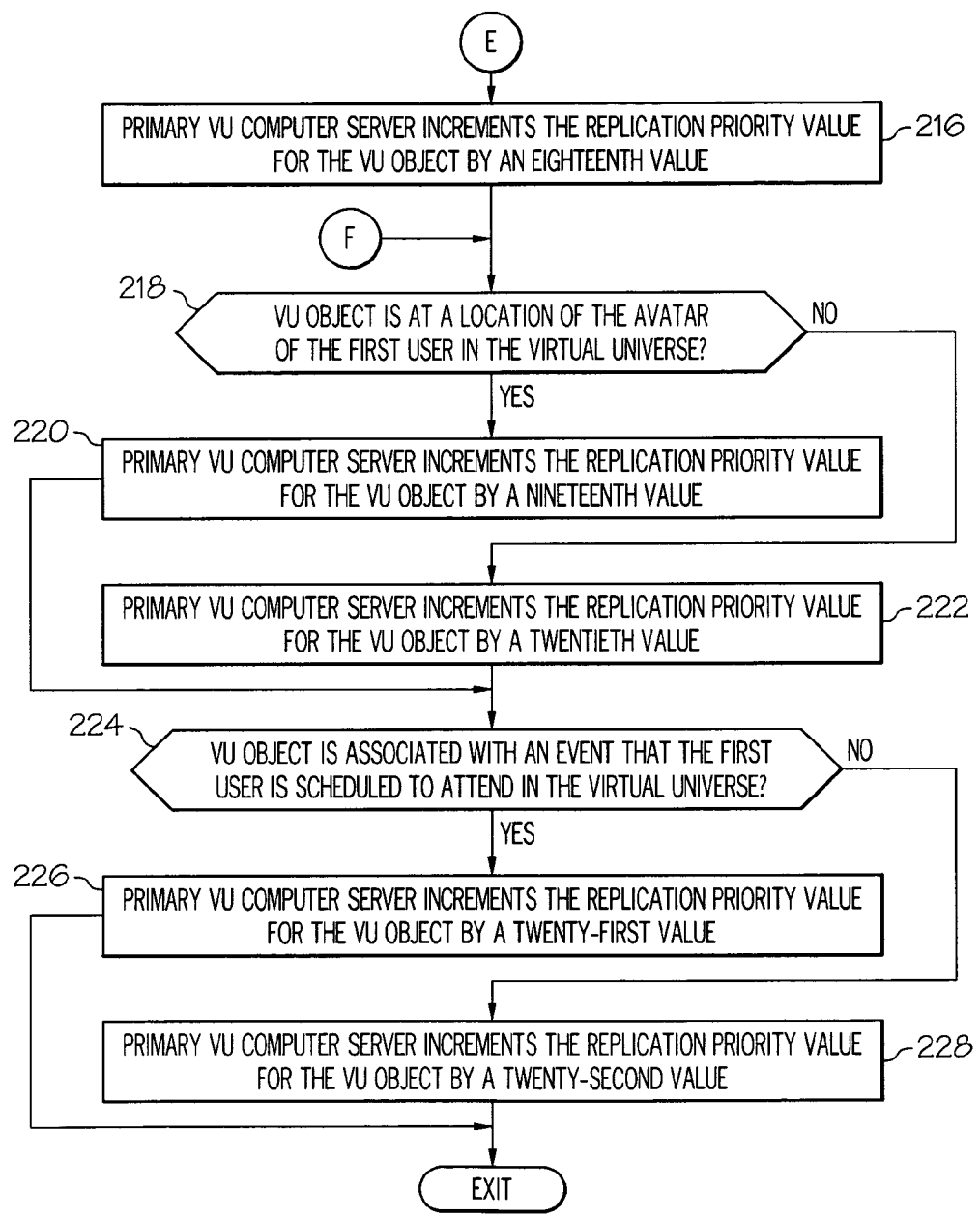

Referring to FIGS. 5 and 6, a flowchart of a method for implementing the step 100 that determines a first set of VU objects associated with the first user will now be explained.

At step 130, the primary VU computer server 20 determines a third set of VU objects identified in a user account associated with the first user.

Next at step 132, the primary VU computer server 20 determines that a first avatar associated with the first user has previously gone to a first location in the virtual universe.

Next at step 134, the primary VU computer server 20 determines a fourth set of VU objects associated with the first location in the virtual universe.

Next at step 136, the primary VU computer server 20 predicts that the first avatar associated with the first user will be going to a second location in the virtual universe. In one exemplary embodiment, the prediction of the second location is based on at least one of past locations in the virtual universe that the first user has traversed and future events the first user is scheduled to attend.

Next at step 138, the primary VU computer server 20 determines a fifth set of VU objects associated with the second location in the virtual universe.

Next at step 140, the primary VU computer server 20 determines a second user having a second avatar in the virtual universe. The second user is associated with the first user. For example, the second user could be on a "buddy list" of the first user.

Next at step 142, the primary VU computer server 20 determines a sixth set of VU objects associated with the second user.

Next at step 144, the primary VU computer server 20 determines the first set of VU objects associated with the first user comprising at least one of the third set of VU objects, the fourth set of VU objects, the fifth set of VU objects and the sixth set of VU objects.

Next at step 146, the primary VU computer server 20 makes a determination as to whether the first user desires to add VU objects to the first set of VU objects associated with the first user. In particular, the primary VU computer server 20 can receive commands from the client computer 34 indicating that the user desires to add other VU objects to the first set of VU objects. If the value of step 146 equals "yes", the method advances to step 148. Otherwise, the method is exited.

At step 148, the first user selects VU objects to be added to the first set of VU objects utilizing either the keyboard 38 or the mouse 40. Data indicating the selection is sent from the client computer 34 to the primary VU computer server via the communication networks 32, 24. After step 148, the method advances to step 150.

At step 150, the primary VU computer server 20 adds the selected VU objects to the first set of VU objects. After step 150, the method is exited.

Referring to FIGS. 7-10, a flowchart of a method for implementing the step 102 that determines replication priority values for the first set of VU objects utilizing predetermined priority value rules will now be explained. The primary VU computer server 20 can perform the following steps for each VU object in the first set of VU objects associated with the first user. When a step includes incrementing the replication priority value, it should be understood that the replication priority value may be incremented by a positive value, zero, or a negative value. Incrementing the replication priority value by a positive value would increase the VU objects replication priority value; a zero would not modify the replication priority value; and a negative value would decrease the replication priority value. In an alternative embodiment, the method may include less than or more than the priority rules depicted in FIGS. 7-10.

At step 170, the primary VU computer server 20 makes a determination as to whether a file size of a VU object is greater than a predetermined file size. If the value of step 170 equals "yes", the method advances to step 172. Otherwise, the method advances to step 174.

At step 172, the primary VU computer server 20 increments the replication priority value for the VU object by a first value. After step 172, the method advances to step 176.

At step 174, the primary VU computer server 20 increments the replication priority value for the VU object by a second value. After step 174, the method advances to step 176.

At step 176, the primary VU computer server 20 makes a determination as to whether a visual size of the VU object on the display device 36 is greater than a predetermined visual size. If the value of step 176 equals "yes", the method advances to step 178. Otherwise, the method advances to step 180.

At step 178, the primary VU computer server 20 increments the replication priority value for the VU object by a third value. After step 178, the method advances to step 182.

At step 180, the primary VU computer server 20 increments the replication priority value for the VU object by a fourth value. After step 180, the method advances to step 182.

At step 182, the primary VU computer server 20 makes a determination as to whether a proximity of the VU object to the avatar of the first user in the virtual universe is less than a predetermined distance. If the value of step 182 equals "yes", the method advances to step 184. Otherwise, the method advances to step 186.

At step 184, the primary VU computer server 20 increments the replication priority value for the VU object by a fifth value. After step 184, the method advances to step 188.

At step 186, the primary VU computer server 20 increments the replication priority value for the VU object by a sixth value. After step 186, the method advances to step 188.

At step 188, the primary VU computer server 20 makes a determination as to whether a VU object is in a field of view of the avatar of the first user in the virtual universe. If the value of step 188 equals "yes", the method advances to step 190. Otherwise, the method advances to step 192.

At step 190, the primary VU computer server 20 increments the replication priority value for the VU object by a seventh value. After step 190, the method advances to step 194.

At step 192, the primary VU computer server 20 increments the replication priority value for the VU object by an eighth value. After step 192, the method advances to step 194.

At step 194, the primary VU computer server 20 makes a determination as to whether a first time interval since the VU object was last accessed by the first user is less than a first predetermined time interval. If the value of step 194 equals "yes", the method advances to step 196. Otherwise, the method advances to step 198.

At step 196, the primary VU computer server 20 increments the replication priority value for the VU object by a ninth value. After step 196, the method advances to step 200.

At step 198, the primary VU computer server 20 increments the replication priority value for the VU object by a tenth value. After step 198, the method advances to step 200.

At step 200, the primary VU computer server 20 makes a determination as to whether a second time interval that the VU object was displayed on the display device 36 is greater than a second predetermined time interval. If the value of step 200 equals "yes", the method advances to step 202. Otherwise, the method advances to step 204.

At step 202, the primary VU computer server 20 increments the replication priority value for the VU object by an eleventh value. After step 202, the method advances to step 206.

At step 204, the primary VU computer server 20 increments the replication priority value for the VU object by a twelfth value. After step 204, the method advances to step 206.

At step 206, the primary VU computer server 20 makes a determination as to whether metadata associated with the VU object matches metadata associated with user account of the first user. If the value of step 206 equals "yes", the method advances to step 208. Otherwise, the method advances to step 210.

At step 208, the primary VU computer server 20 increments the replication priority value for the VU object by a thirteenth value. After step 208, the method advances to step 212.

At step 210, the primary VU computer server 20 increments the replication priority value for the VU object by a fourteenth value. After step 210, the method advances to step 212.

At step 212, the primary VU computer server 20 makes a determination as to whether a number of times that the first user accessed the VU object over a third time interval is greater than a predetermined number of times. If the value of step 212 equals "yes", the method advances to step 214. Otherwise, the method advances to step 216.

At step 214, the primary VU computer server 20 increments the replication priority value for the VU object by a seventeenth value. After step 214, the method advances to step 218.

At step 216, the primary VU computer server 20 increments the replication priority value for the VU object by an eighteenth value. After step 216, the method advances to step 218.

At step 218, the primary VU computer server 20 makes a determination as to whether the VU object is at a location of the avatar of the first user in the virtual universe. If the value of step 218 equals "yes", the method advances to step 220. Otherwise, the method advances to step 222.

At step 220, the primary VU computer server 20 increments the replication priority value for the VU object by a nineteenth value. After step 220, the method advances to step 224.

At step 222, the primary VU computer server 20 increments the replication priority value for the VU object by a twentieth value. After step 222, the method advances to step 224.

At step 224, the primary VU computer server 20 makes a determination as to whether the VU object is associated with an event that the user is scheduled to attend in the virtual universe. If the value of step 224 equals "yes", the method advances to step 226. Otherwise, the method advances to step 228.

At step 226, the primary VU computer server 20 increments the replication priority value for the VU object by a twenty-first value. After step 226, the method is exited.

At step 228, the primary VU computer server 20 increments the replication priority value for the VU object by a twenty-second value. After step 228, the method is exited.

Figure 11:
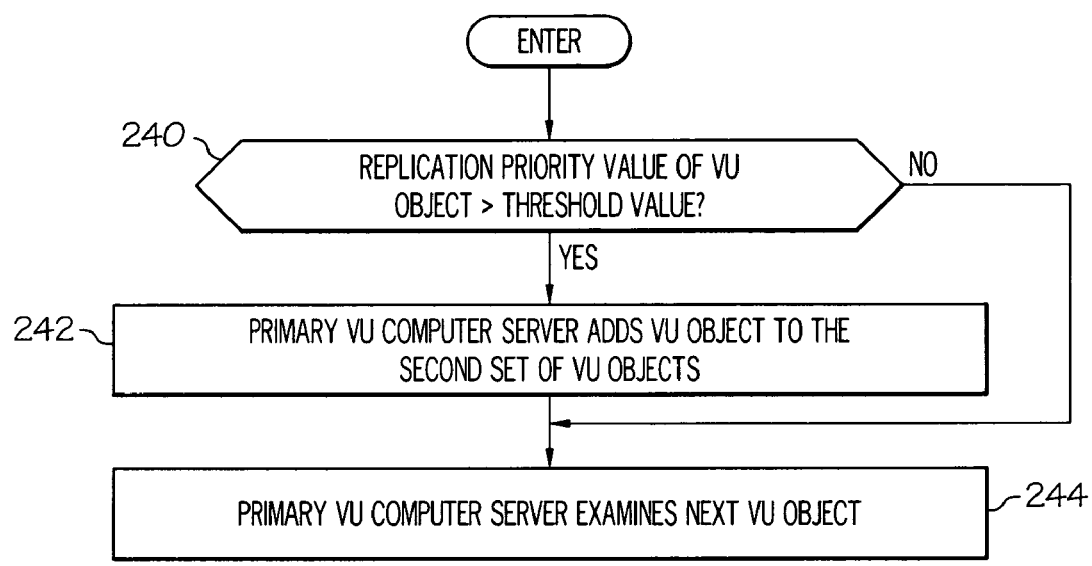

Referring to FIG. 11, a flowchart of a method for implementing the step 104 that determines a second set of VU objects from the first set of VU objects based upon replication priority values associated with the first set of VU objects will now be explained. The primary VU computer server 20 can perform the following steps for each VU object in the first set of VU objects.

At step 240, the primary VU computer server 20 makes a determination as to whether a replication priority value of the VU object is greater than a threshold value. If the value of step 240 equals "yes", the method advances to step 242. Otherwise, the method advances to step 244. The threshold value may be a static number or may be dynamically set, for example, to ensure that a certain number of VU objects are replicated or a total file size is replicated.

At step 242, the primary VU computer server 20 adds the VU object to the second set of VU objects. After step 242, the method advances to step 244.

At step 244, the primary VU computer server 20 examines the next VU object. After step 244, the method is exited.

Figure 12:
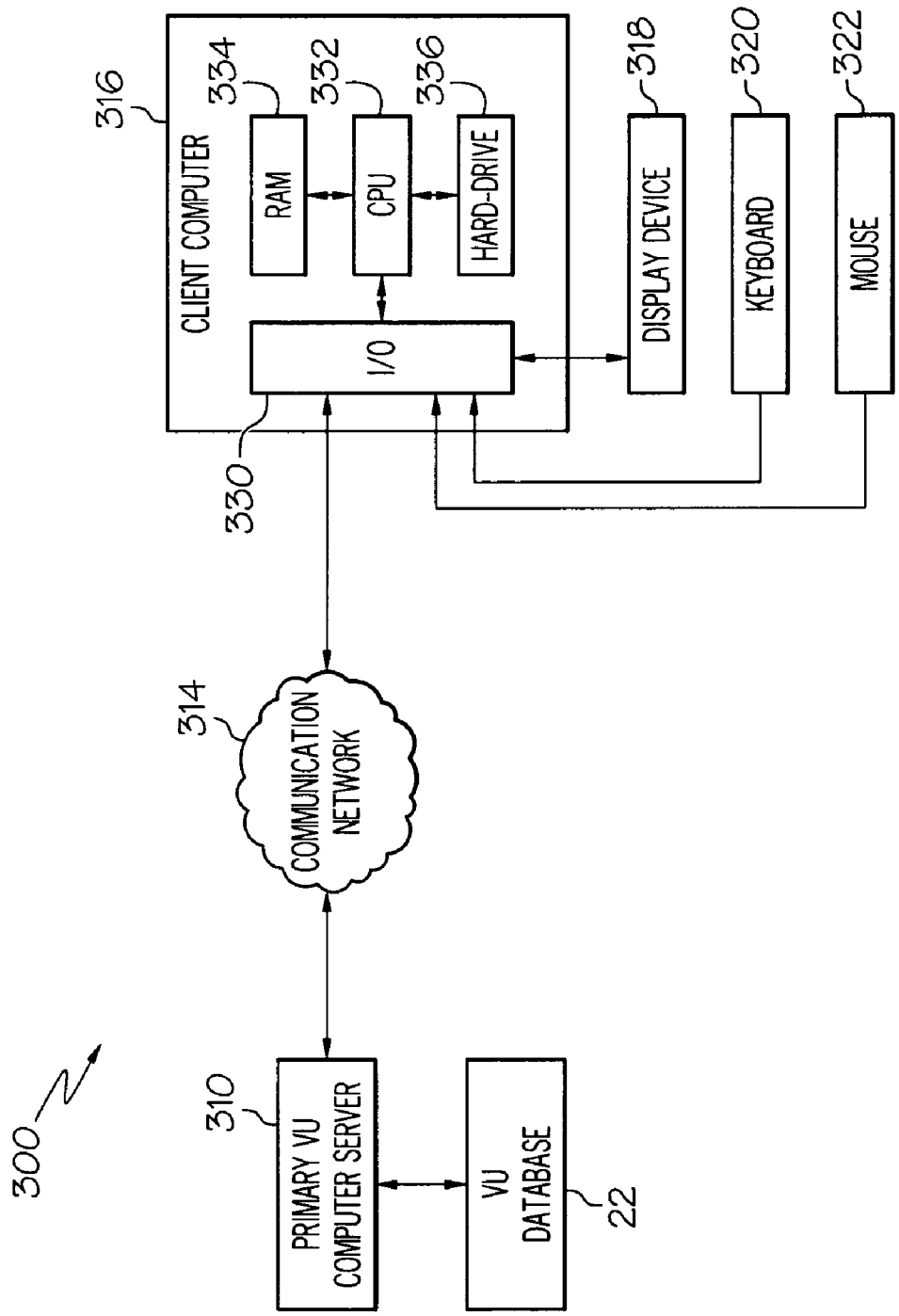
FIG. 12 is a schematic of another system for the replicating VU objects in a virtual universe in accordance with another exemplary embodiment.

Referring to FIG. 12, a system 300 for replicating VU objects of the virtual universe in accordance with another exemplary embodiment is provided. The system 300 includes a primary VU computer server 310, the VU database 22, a communication network 314, a client computer 316, a display device 318, a keyboard 320, and a mouse 322. An advantage of the system 300 is that the system 300 determines replication priority values for VU objects associated with the first user utilizing predetermined priority value rules and replicates a predetermined subset of VU objects of the virtual universe from the primary VU computer server 310 to the client computer 316. Accordingly, the client computer 316 does not have to subsequently query the primary VU computer server 310 for these VU objects.

The primary VU computer server 310 is configured to execute software routines for providing data corresponding to an avatar and VU objects associated with a user in response to requests received from the client computer 316. Further, the primary VU computer server 310 is configured to replicate a subset of the VU objects in a virtual universe to the client computer 316 as will be described in further detail below. Referring to FIGS. 2 and 13, in one exemplary embodiment, the primary VU computer server 310 can retrieve VU Object UUIDs 70 and associated VU objects 72 from the VU database 22. Further, the primary VU computer server 310 can replicate a subset of the VU Objects UUIDs 70 and the VU objects 72 to the client computer 316 as will be described in further detail below. In one exemplary embodiment, the subset of the VU Objects UUIDs 70 and the VU objects 72 are VU Object UUIDs 350 and VU objects 352, respectively. Upon receipt of the VU Object UUIDs 350 and the VU objects 352, the client computer 316 stores the VU Object UUIDs 350 and the VU objects 352 in the hard-drive 336.

The communication network 314 is configured to route data between the primary VU computer server 310 and the client computer 316.

The client computer 316 is configured to receive VU Object UUIDs and associated VU objects from the primary VU computer server 310. Further, the client computer 316 is configured to display VU objects in the virtual universe on the display device 318. The client computer 316 includes an I/O interface 330, a CPU 332, a RAM 334, and a hard-drive 336. The CPU 332 operably communicates with the I/O interface 330, the RAM 334, and the hard-drive 336. The CPU 332 executes algorithms stored in the hard-drive 336 and the RAM 334 for displaying the virtual universe and associated VU objects and avatars on the display device 318. The CPU 332 also receives commands from the keyboard 320 and the mouse 322, via the I/O interface 330, for moving an avatar to desired locations within the virtual universe and for allowing the avatar to complete desired tasks at desired locations within the virtual universe.

Referring to FIG. 14, a flowchart of a method for replicating VU objects in a virtual universe utilizing the system 300 in accordance with another exemplary embodiment will be explained.

At step 370, the primary VU computer server 310 determines a first set of VU objects associated with a first user.

Next at step 372, the primary VU computer server 310 determines replication priority values for the first set of VU objects utilizing predetermined priority value rules. Each VU object of the first set of VU objects has a replication priority value.

Next at step 374, the primary VU computer server 310 determines a second set of VU objects from the first set of VU objects based on the replication priority values associated with the first set of VU objects.

Next at step 376, the primary VU computer server 310 replicates the second set of VU objects to the client computer 316.

Next at step 378, the client computer 316 induces the display device 318 to display at least a portion of the second set of VU objects on the display device 318. After step 378, the method is exited.

The above-described methods can be at least partially embodied in the form of one or more computer readable media having computer-executable instructions for practicing the method. The computer-readable media can comprise one or more of the following: floppy diskettes, CD-ROMs, hard-drives, flash memory, and other computer-readable media known to those skilled in the art; wherein, when the computer-executable instructions are loaded into and executed by one or more computers or computer servers, the one or more computers or computer servers become an apparatus for practicing the invention.

The system, the method, and the computer readable media for replicating VU objects in a virtual universe represent a substantial advantage over other systems, methods, and computer readable media. In particular, the system, the method, and the computer readable media provide a technical effect of determining replication priority values for VU objects associated with a user utilizing predetermined priority value rules and replicates a portion of the VU objects based on replication priority values.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for replicating virtual universe (VU) objects of a virtual universe, the method comprising the steps of:
   a computer determining a first set of VU objects associated with a first user;
   the computer determining replication priority values for the first set of VU objects utilizing predetermined replication priority value rules, wherein each VU object in the first set of VU objects has a replication priority value, and wherein the step of the computer determining the replication priority values for the first set of VU objects utilizing the predetermined replication priority values comprises:
   the computer incrementing the replication priority value of a first VU object in the first set of VU objects by a positive value responsive to a first determination; and
   the computer incrementing the replication priority value of a second VU object in the first set of VU objects by a negative value responsive to a second determination;
   the computer determining a second set of VU objects from the first set of VU objects based on the replication priority values associated with the first set of VU objects; and
   the computer replicating the second set of VU objects to a first device;
   wherein the predetermined replication priority value rules are based on a file size of a VU object, a visual size of the VU object on a display device, a proximity of the VU object to a user avatar in the virtual universe, and a field of view of the user avatar in the virtual universe.

2. The method of claim 1, wherein the step of the computer determining the first set of VU objects associated with the first user comprises the step of the computer determining VU objects identified in a user account associated with the first user.

3. The method of claim 1, wherein the step of the computer determining the first set of VU objects associated with the first user comprises the steps of:
   the computer determining that a first avatar associated with the first user has previously gone to a location in the virtual universe; and
   the computer determining VU objects associated with the location in the virtual universe.

4. The method of claim 1, wherein the step of the computer determining the first set of VU objects associated with the first user comprises the steps of:
   the computer predicting that a first avatar associated with the first user will be going to a location in the virtual universe; and
   the computer determining VU objects associated with the location in the virtual universe.

5. The method of claim 1, wherein the step of the computer determining the first set of VU objects associated with the first user comprises the steps of:
   the computer determining a second user having a second avatar in the virtual universe, the second user being associated with the first user; and
   the computer determining VU objects associated with the second user.

6. The method of claim 1, wherein the first determination is at least one of whether a file size of the first VU object is greater than a predetermined file size, whether a visual size of the first VU object on a display screen is greater than a predetermined visual size, and whether the first VU object is in a field of view of an avatar of the display screen in the virtual universe.

7. The method of claim 1, wherein the first device is a client computer.

8. A computer system for replicating virtual universe (VU) objects of a virtual universe, the computer system comprising:
   one or more processors, one or more computer-readable memories and one or more computer-readable tangible storage devices;
   program instructions, stored on at least one of the one or more storage devices for execution by at least one of the one or more processors via at least one of the one or more memories, to determine a first set of VU objects associated with a first user;
   program instructions, stored on at least one of the one or more storage devices for execution by at least one of the one or more processors via at least one of the one or more memories, to determine replication priority values for the first set of VU objects utilizing predetermined replication priority value rules, wherein each VU object in the first set of VU objects has a replication priority value; and wherein the program instructions to determine the replication priority values for the first set of VU objects utilizing the predetermined replication priority value rules:
   increment the replication priority value of a first VU object in the first set of VU objects by a positive value responsive to a first determination; and
   increment the replication priority value of a second VU object in the first set of VU objects by a negative value responsive to a second determination;
   program instructions, stored on at least one of the one or more storage devices for execution by at least one of the one or more processors via at least one of the one or more memories, to determine a second set of VU objects from the first set of VU objects based on the replication priority values associated with the first set of VU objects; and
   program instructions, stored on at least one of the one or more storage devices for execution by at least one of the one or more processors via at least one of the one or more memories, to replicate the second set of VU objects to t4aea first device;
   wherein the predetermined replication priority value rules are based on a file size of a VU object, a visual size of the VU object on a display device, a proximity of the VU object to a user avatar in the virtual universe, and a field of view of the user avatar in the virtual universe.

9. The computer system of claim 8, wherein the first determination is at least one whether a file size of the first VU object is greater than a predetermined file size, whether a visual size of the first VU object on a display screen is greater than a predetermined visual size, and whether the first VU object is in a field of view of an avatar of the display screen in the virtual universe.

10. The computer system of claim 8, wherein the first device is a client computer.

11. The computer system of claim 8, wherein:
the program instructions to determine the replication priority values for the first set of VU objects utilizing the predetermined replication priority value rules base the replication priority value rules on at least one of a file size of a VU object, a visual size of the VU object on a display device, a proximity of the VU object to a user avatar in the virtual universe, a field of view of the user avatar in the virtual universe, a first time interval since the VU object was last accessed by the user, a second time interval that the VU object was displayed on a display device, metadata associated with the VU object, a number of times that the user accessed the VU object over a third time interval, a location of the user avatar in the virtual universe, and an event that the user is scheduled to attend in the virtual universe.

12. A computer program product for replicating virtual universe (VU) objects of a virtual universe, the computer program product comprising:
one or more computer-readable tangible storage devices;
program instructions, stored on at least one of the one or more storage devices, to determine a first set of VU objects associated with a first user;
program instructions, stored on at least one of the one or more storage devices, to determine replication priority values for the first set of VU objects utilizing predetermined replication priority value rules, wherein each VU object in the first set of VU objects has a replication priority value, and wherein the program instructions to determine the replication priority values for the first set of VU objects utilizing the predetermined replication priority value rules;
increment the replication priority value of a first VU object in the first set of VU objects by a positive value responsive to a first determination; and
increment the replication priority value of a first VU object in the first set of VU objects by a negative value responsive to a second determination;
program instructions, stored on at least one of the one or more storage devices, to determine a second set of VU objects from the first set of VU objects based on the replication priority values associated with the first set of VU objects; and
program instructions, stored on at least one of the one or more storage devices, to replicate the second set of VU objects to a first device;
wherein the predetermined replication priority value rules are based on a file size of a VU object, a visual size of the VU object on a display device, a proximity of the VU object to a user avatar in the virtual universe, and a field of view of the user avatar in the virtual universe.

13. The computer program product of claim 12, wherein the program instructions to determine the first set of VU objects associated with the first user determine VU objects identified in a user account associated with the first user.

14. The computer program product of claim 12, wherein the program instructions to determine the first set of VU objects associated with the first user:
determine that a first avatar associated with the first user has previously gone to a location in the virtual universe; and
determine VU objects associated with the location in the virtual universe.

15. The computer program product of claim 12, wherein the program instructions to determine the first set of VU objects associated with the first user:
predict that a first avatar associated with the first user will be going to a location in the virtual universe; and
determine VU objects associated with the location in the virtual universe.

16. The computer program product of claim 12, wherein the program instructions to determine the first set of VU objects associated with the first user:
determine a second user having a second avatar in the virtual universe, the second user being associated with the first user; and
determine VU objects associated with the second user.

17. The computer program product of claim 12, wherein the program instructions to determine the replication priority values for the first set of VU objects utilizing the predetermined replication priority value rules base the replication priority value rules on at least one of a file size of a VU object, a visual size of the VU object on a display device, a proximity of the VU object to a user avatar in the virtual universe, a field of view of the user avatar in the virtual universe, a first time interval since the VU object was last accessed by the user, a second time interval that the VU object was displayed on a display device, metadata associated with the VU object, a number of times that the user accessed the VU object over a third time interval, a location of the user avatar in the virtual universe, and an event that the user is scheduled to attend in the virtual universe.

* * * * *